March 14, 1961　　　F. C. BEURER　　　2,974,901
AIRCRAFT CONTROL LINKAGE
Filed Feb. 19, 1959　　　2 Sheets-Sheet 2
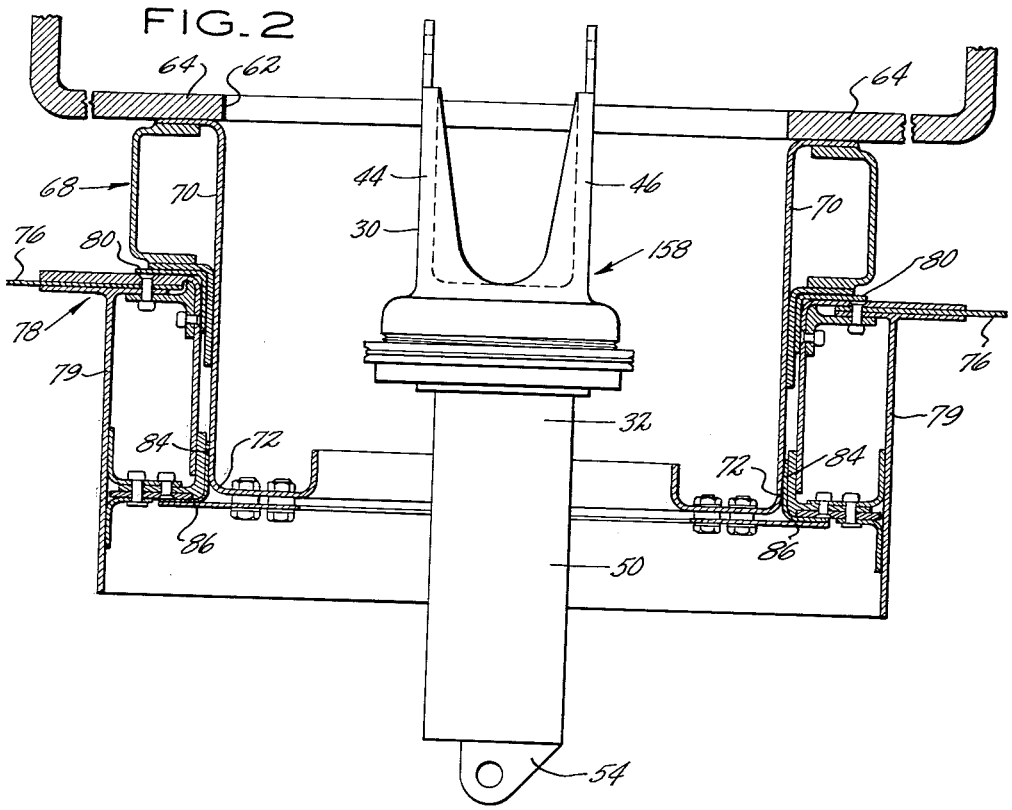
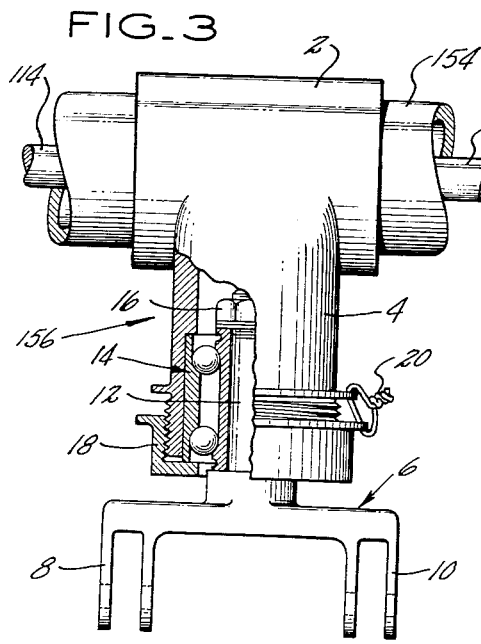
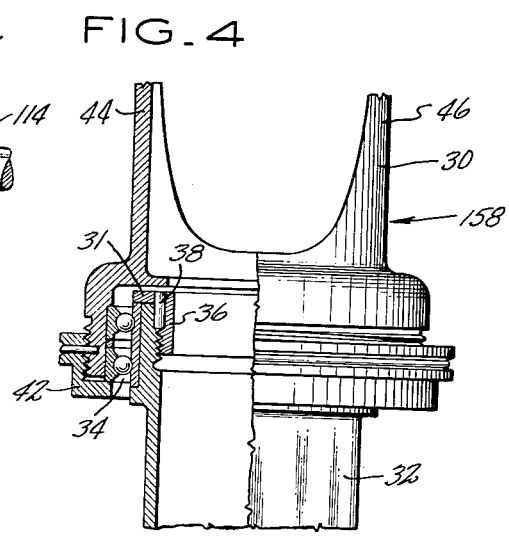
INVENTOR
FREDERICK C. BEURER
BY Jack N. McCarthy
AGENT United States Patent Office 2,974,901
Patented Mar. 14, 1961

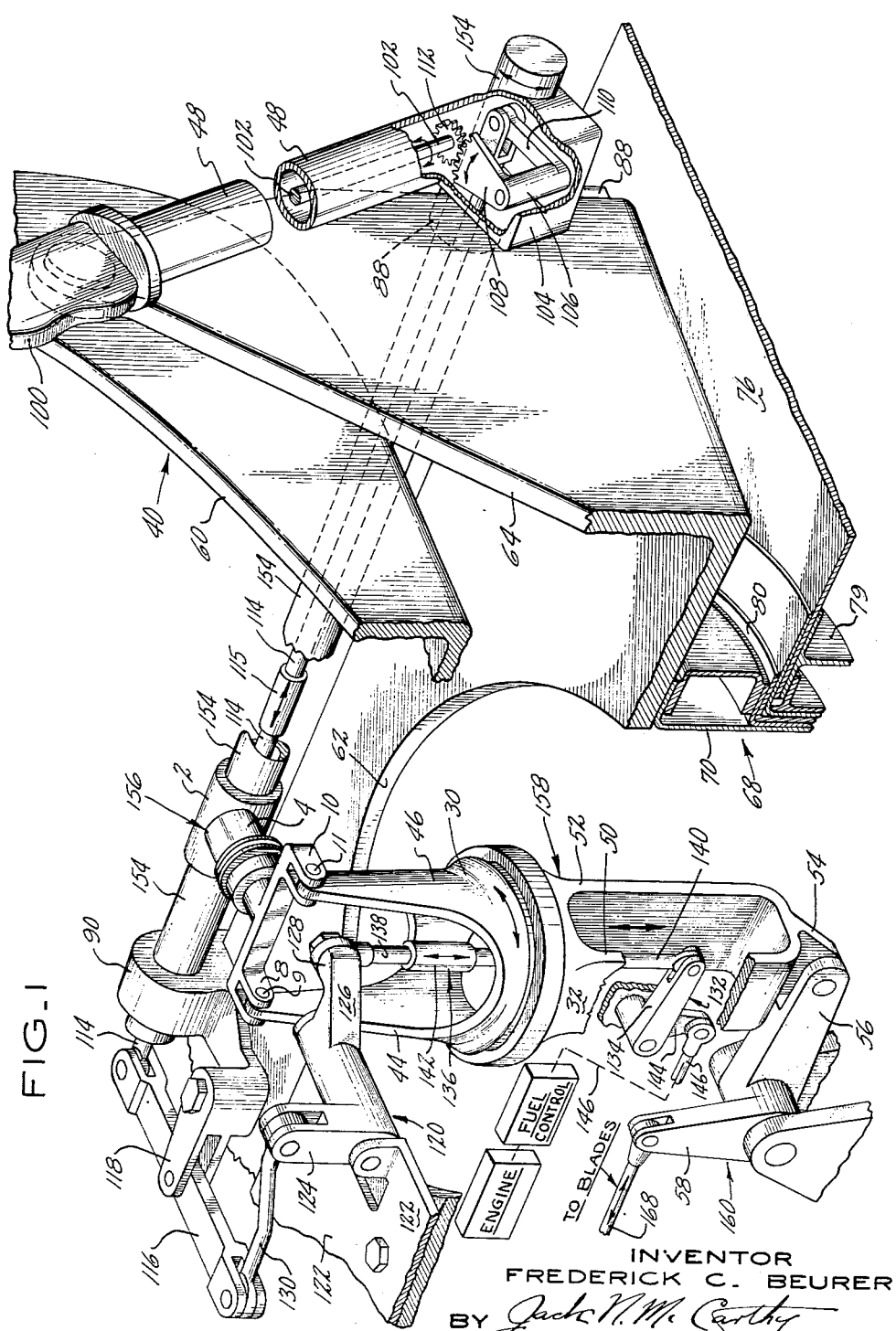

2,974,901
AIRCRAFT CONTROL LINKAGE
Frederick C. Beurer, Hamden, Conn., assignor to United Aircraft Corporation, East Hartford, Conn., a corporation of Delaware
Filed Feb. 19, 1959, Ser. No. 794,377
11 Claims. (Cl. 244—17.11)

This invention relates to an aircraft and its controls.

An object of this invention is to provide an operator's seat which can rotate from a forward position to a rearward position having the collective pitch lever and throttle control attached thereto and being operative throughout any motion of the seat and at any position thereof.

Another object of this invention is to provide an aircraft in which the throttle control is operative through a link extending through the member upon which the operator's seat rotates.

A further object of this invention is to provide an aircraft with a maximum number of controls so that they are constantly within the operator's reach at the same position while permitting rotation of the operator's seat.

These and other objects and advantages of the invention will be pointed out in connection with the following detailed description of the drawings in which one embodiment is illustrated.

In the drawings:

Fig. 1 is a fragmentary view showing a portion of the operator's seat and supporting member with the control linkage passing therethrough;

Fig. 2 is a front view of the main collective pitch link showing the seat and its support in section;

Fig. 3 is a view partially in section of the collective pitch lever arm assembly; and Fig. 4 is a view partially in section of the central portion of the main collective pitch link.

Referring to Fig. 1, the seat construction shown therein can be used on any aircraft in which rotation of the operator's seat is necessary, however, U.S. Application Serial No. 735,057 filed May 13, 1958, shows a crane helicopter in which this seat would be especially useful. However, since no specific aircraft construction is necessary for this invention, none is shown.

The operator's seat 40 is constructed having a seat section 60 pivotally mounted on a U-shaped member 64. The seat section 60 is of the type adapted to be fixedly positioned in a number of positions at the operator's will. The center of the bottom portion of the U-shaped member 64 has a hole 62 therein. Below this hole and around its periphery, a reinforced annular member 68 is fixed and projects downwardly therefrom. Member 68 comprises an annular box section 70 at its top having a cylindrical portion extending downwardly with an inwardly projecting flange 72 at its bottom. Member 68 projects into a reinforced portion 78 of the aircraft floor 76. This reinforced portion extends around a hole in the aircraft floor 76 and comprises a plurality of annular members riveted and welded together forming a box section 79 to support the annular member 68 of the seat 40. An annular bearing member 80 extends around the top edge of the reinforced box 79 formed in the floor of the helicopter on which the bottom of the box section 70 rests and which also guides the cylindrical portion of member 68 projecting downwardly from the box 70. A second annular bearing member 84 extends around the bottom edge of the reinforced box formed in the floor of the aircraft within which the bottom portion of the downwardly extending cylindrical portion of member 68 is guided. An annular disc 86 is positioned below said flange 72 and reinforced portion 78 of the aircraft floor. The outer edge of the plate member engages the bottom portion of the bearing member 84 and the inner edge is bolted to the inwardly extending flange 72 of member 68. This prevents the seat from lifting out of the hole in the aircraft floor.

Also mounted on the U-shaped member 64 is a collective pitch stick 48 which rotates with the seat 40. The stick 48 is fixed to a tubular shaft 154 which is mounted for rotation between a bracket 88 and bracket 90. These brackets may be fixed to the U-shaped member 64 by any means desired. A collective pitch lever arm assembly 156 extends from shaft 154 so that its ends is positioned over the hole 62 of the bottom of the U-shaped member 64.

This collective pitch lever arm assembly 156, shown in detail in Fig. 3, comprises a sleeve 2 fixed around the shaft 154 with a lever arm 4 projecting therefrom at an angle of 90°. The lever arm 4 is tubular and has an external thread at its outer end. A bracket 6 having two tined ends 8 and 10 is formed with a shaft 12 which projects into the tubular arm 4. Bearing means 14 are provided between the shaft 12 and inner portion of the tubular arm 4 to permit relative rotational movement between the bracket 6 and lever arm 4. The inner race, which may be made of two parts, of the bearing member 14 is fixed to the shaft 12 by nut 16 and the outer race of the bearing member 14 is fixed in the end of arm 4 against an abutment in the arm by a threaded cap 18. This cap 18 is prevented from rotation on the arm by lock wire 20.

A main collective pitch link 158 extends through the hole 62 in the bottom of U-shaped member 64 and through the annular reinforcing members of the seat and floor of the aircraft. This link is comprised of two main parts 30 and 32. These two parts are mounted for relative rotation about their center lines on bearing means 34. The inner race of the bearing means is held on to the top portion of part 32 against an abutment on the top portion by a flange 31 on a member 36 threaded into the top of part 32. This member is prevented from rotation by a pin 38. The outer races of the bearing member 34 are held in position by a cap 42 which is threadably positioned on the bottom of part 30 of link 158 (see Fig. 4). The upper part 30 of link 158 has two upwardly extending arms 44 and 46. The top of arm 44 is positioned in the tined end 8 of collective pitch lever arm assembly 156, and the top of arm 46 is positioned in the tined end 10. These arms are held in position by pins 9 and 11, respectively, which pass through holes in the ends of arms 44 and 46 and tined ends 8 and 10, respectively.

The bottom part 32 of link 158 is formed having two downwardly projecting arms 50 and 52. These arms are connected at their lower ends and form a single arm 54. This arm 54 is pivotally connected at its end to one arm 56 of a bell crank lever 160. This lever 160 is pivoted to fixed structure on the aircraft. The other arm 58 of bell crank lever 160 has its ends connected to a rod 168 which extends to the blades or blade operating system of a helicopter. Such an operating system is shown in U.S. Application Serial No. 741,531 filed June 12, 1958, and U.S. Application Serial No. 570,736 filed March 12, 1956.

It can now be seen that as the collective pitch lever 48 is rotated, it in turn rotates shaft 154 within bearing members 88 and 90. This rotation of shaft 154 moves collective pitch lever arm assembly 156, about shaft 154 as an axis, with the outer tine ends moving in either an upward or downward direction depending on the direction of movement of the collective pitch lever 48. These tined ends in turn move link 158 in the same direction with this motion being transmitted therethrough to the end of arm 56 of bell crank lever 160. This movement is then transmitted to rod 168 and from there to the blades or their operating system.

The handle 100 of the tubular collective pitch lever 48 is rotatably mounted thereon and has a shaft 102 connected thereto which extends through the collective pitch lever 48 into a housing 104 formed at the point where collective pitch lever 48 meets with shaft 154. In housing 104 a unit is mounted for oscillation on a short shaft 106 with a gear segment 108 projecting from one end and a lever arm 110 projecting from the other end. A gear 112 is mounted on one end of shaft 102 in a manner so that it engages the teeth of gear segment 108. The free end of lever arm 110 is positioned on the axis of the shaft 154. A rod 114 extends through tubular shaft 154 and is connected at one end to the free end of lever arm 110 and has its other end projecting out of the other end of tubular shaft 154. A lever 116 is pivotally mounted at its center point on an arm 118 which is a part of bracket 90. Rod 114 is constructed so that one end is relatively rotatable with respect to the other end. The portion of rod 114 connected to the lever arm 110 obtains this movement with the other end of the rod 114 which is attached to the lever 116 by bearing means within sleeve 115. While a specific device has been shown permitting relative rotation between opposite ends of the rod 114, it is to be understood that other devices or means can be used. This connection in rod 114 permits collective pitch stick 48 to pivot without placing an unwanted torque in rod 114. One end of lever 116 is positioned on the center line of tubular shaft 154 and is connected to the end of rod 114 which projects therefrom.

A bell crank lever 120 is mounted on a bracket 122 which is fixed to the bottom of U-shaped member 64. This bracket 122 projects over the hole 62 formed in the bottom of the U-shaped member 64 and it is this portion of the bracket which supports the shaft portion of the bell crank lever 120. One lever arm 124 extends upwardly from the bell crank and lever arm 126 extends laterally towards the center line of the hole 62 and link 158. The free end of arm 126 has a portion 128 which projects into the space between arms 44 and 46 to a point near the center line of the hole 62 and link 158. A link 130 is connected at one end to the free end of lever 116 and at its other end to the free end of arm 124.

A bell crank lever 132 is located beneath the floor of said aircraft and pivoted for movement on a portion of the fixed structure of the aircraft. One arm 134 of the bell crank projects between the arms 50 and 52 of the lower part of link 158 to a point near the center line of the link 158. The free end of arm 126 at the end of part 128 is connected by a link 136 having relatively rotating ends to the free end of arm 134. The upper part 138 of the link 136 is relatively rotatable with lower portion 140 of the link by bearing means within sleeve 142. This rotatable connection is similar to that of rod 114. The free end of arm 144 of bell crank 132 is connected to the controlling means of a fuel control by a rod 146. The fuel control in turn is connected to the power plant of the aircraft. The power plant can be connected through a transmission to drive the rotor blades of a helicopter.

It can be seen that when handle 100 is rotated, shaft 102 in turn rotates gear 112. Movement of gear segment 108 and therefore moves the teeth of the gear segment 108 and therefore rotates short shaft 106 thereby turning arm 110 through an angle of movement. When the free end of arm 110 moves, rod 114 is actuated thereby moving the end of lever 116 to which it is attached. This movement of the end of lever 116 moves the other end of lever 116 in the opposite direction. This movement of lever 116 is transmitted to the free end of arm 124 of bell crank 120 by link 130. Movement of the bell crank 120 is transmitted therethrough to lever arm 126 which in turn actuates bell crank 132 by link 136. The output arm 144 is then moved and in turn moves the control means of the fuel control through rod 146.

The above actions for the collective pitch lever 48 and handle 100 obtain for all movements of the operator's seat 40 as it rotates about its support, these actions being made possible by the rotative action of the upper and lower parts 30 and 32 of link 158 and parts 138 and 140 of link 136.

It is to be understood that the invention is not limited to the specific embodiment herein illustrated and described, but may be used in other ways without departure from its spirit as defined by the following claims.

I claim:
1. In a helicopter having rotor blades mounted thereon for pitch changing movement, an engine for driving said blades, a fuel control connected to said engine, an operator's seat having a hollow supporting member, an operator's control stick mounted on said seat for pivotal movement, said operator's control stick also having a separately moveable portion, means passing through said hollow member operatively connecting said stick and said blades so that pivotal movement of said control stick adjusts the pitch of said blades, and second means passing through said hollow member operatively connecting said stick to said fuel control so that actuation of said moveable portion of said control stick actuates said fuel control.

2. In an aircraft, a floor, an operator's seat, said seat being mounted for rotation, said floor having a hole under said seat, an operator's control stick, means mounting said operator's control stick for movement with said seat, said mounting means mounting said stick for pivotal movement, said operator's stick having a separately moveable portion thereon, first control means requiring actuation, second control means requiring actuation, means passing through the hole under said seat operatively connecting said stick with said first control means so that pivotal movement of said stick transmits its movement through said hole at any position of said seat to actuate said first control means, and second means passing through the hole under said seat operatively connecting said moveable portion of said stick with said second control means so that movement of said moveable portion of said stick transmits its movement through said hole at any position of said seat to actuate said second control means.

3. In an aircraft, a floor, an operator's seat, said seat being mounted for rotation about an axis, said floor having a hole under said seat, an operator's control stick, means mounting said operator's control stick for movement with said seat, said mounting means having a tubular shaft mounted for rotation on said seat, said stick being connected to said shaft to rotate it, said operator's stick having a separately moveable portion, first actuatable means, second actuatable means, an arm extending from said tubular shaft over said hole, means passing through the hole under said seat operatively connecting said arm with said first actuatable means so that movement of said stick transmits movement through said hole at any position of said seat to actuate said first actuatable means, and second means passing through the hole under said seat operatively connecting said moveable portion of said stick with said second actuatable means so that movement of said moveable portion of said stick transmits movement through said hole at any position of said seat to actuate said second actuatable means.

4. In an aircraft, a floor, an operator's seat, said seat being mounted for rotation about an axis, said floor having a hole under said seat, an operator's control stick, means mounting said operator's control stick for movement with said seat, said mounting means having a tubular shaft mounted for rotation on said seat, said stick being connected to said shaft to rotate it, said operator's stick having a separately moveable portion, rod means in said tubular shaft, one end of said rod means being connected to said separately moveable portion for movement therewith, first actuatable means, second actuatable means, an arm extending from said tubular shaft over said hole, means passing through the hole under said seat operatively connecting said arm with said first actuatable means so that movement of said stick transmits movement through said hole at any position of said seat to actuate said first actuatable means, and second means passing through the hole under said seat operatively connecting said rod means with said second actuatable means so that movement of said moveable portion of said stick transmits movement through said hole at any position of said seat to actuate said second means.

5. In an aircraft, a floor, an operator's seat, said seat being mounted for rotation about an axis, said floor having a hole under said seat, an operator's control stick, means mounting said operator's control stick for movement with said seat, said mounting means having a tubular shaft mounted for rotation on said seat, said stick being connected to said shaft to rotate it, said operator's stick having a separately moveable portion, first actuatable means, second actuatable means, an arm extending from said tubular shaft over said hole, means passing through the hole under said seat operatively connecting said arm with said first actuatable means so that movement of said stick transmits movement through said hole at any position of said seat to actuate said first actuatable means, said last named means including a link attached to one end of said arm and extending to a point below said seat, a lever pivoted to said aircraft below said seat, said link being connected at its other end to said lever, and second means passing through the hole under said seat operatively connecting said moveable portion of said stick with said second actuatable means so that movement of said moveable portion of said stick transmits movement through said hole at any position of said seat to actuate said second actuatable means.

6. In an aircraft, a floor, an operator's seat, said seat being mounted for rotation about an axis, said floor having a hole under said seat, an operator's control stick, means mounting said operator's control stick for movement with said seat, said mounting means having a tubular shaft mounted for rotation on said seat, said stick being connected to said shaft to rotate it, said operator's stick having a separately moveable portion, first actuatable means, second actuatable means, an arm extending from said tubular shaft over said hole, means passing through the hole under said seat operatively connecting said arm with said first actuatable means so that movement of said stick transmits movement through said hole at any position of said seat to actuate said first actuatable means, said last named means including a tubular link attached at one end to said arm and extending to a point below said seat, a lever pivoted to said aircraft below said seat, said link being connected at its other end to said lever, and second means passing through the hole under said seat and through said tubular link operatively connecting said moveable portion of said stick with said second actuatable means so that movement of said moveable portion of said stick transmits movement through said hole and tubular link at any position of said seat to actuate said second actuatable means.

7. In an aircraft, a floor, an operator's seat, said seat being mounted for rotation about an axis, said floor having a hole under said seat, an operator's control stick, means mounting said operator's control stick for movement with said seat, said mounting means having a tubular shaft mounted for rotation on said seat, said stick being connected to said shaft to rotate it, said operator's stick having a separately moveable portion, rod means in said tubular shaft, one end of said rod means being connected to said separately moveable portion for movement therewith, first actuatable means, second actuatable means, an arm extending from said tubular shaft over said hole, means passing through the hole under said seat operatively connecting said arm with said first actuatable means so that movement of said stick transmits movement through said hole at any position of said seat to actuate said first actuatable means, said last named means including a tubular link attached at one end to said arm and extending to a point below said seat, a lever pivoted to said aircraft below said seat, said link being connected at its other end to said lever, and second means passing through the hole under said seat and through said tubular link operatively connecting said rod with said second actuatable means so that movement of said moveable portion of said stick transmits movement through said hole and tubular link at any position of said seat to actuate said second means, said last named means including a second link operatively connected to said rod means extending into said tubular link to a point below said seat, a second lever pivoted to said aircraft below said seat, said second link being connected at its other end to said second lever.

8. In an aircraft, a floor, an operator's seat, said seat being mounted for rotation about an axis, said floor having a hole under said seat, an operator's control stick, means mounting said operator's control stick for movement with said seat, said mounting means having a tubular shaft mounted for rotation on said seat, said stick being connected to said shaft to rotate it, said operator's stick having a separately moveable portion, a rod in said tubular shaft, one end of said rod having relative rotative movement with the other end, one end of said rod being connected to said separately moveable portion for movement therewith, first actuatable means, second actuatable means, an arm extending from said tubular shaft over said hole, means passing through the hole under said seat operatively connecting said arm with said first actuatable means so that movement of said stick transmits movement through said hole at any position of said seat to actuate said first actuatable means, said last named means including a tubular link attached at one end to said arm and extending to a point below said seat, a lever pivoted to said aircraft below said seat, said link being connected at its other end to said lever, and second means passing through the hole under said seat and through said tubular link operatively connecting said rod with said second actuatable means so that movement of said moveable portion of said stick transmits movement through said hole and tubular link at any position of said seat to actuate said second means, said last named means including a second link operatively connected to the free end of said rod extending into said tubular link to a point below said seat, a second lever pivoted to said aircraft below said seat, said second link being connected at its other end to said second lever.

9. In an aircraft, a floor, an operator's seat, said seat being mounted for rotation about an axis, said floor having a hole under said seat, an operator's control stick, means mounting said operator's control stick for movement with said seat, said mounting means having a tubular shaft mounted for rotation on said seat, said stick being connected to said shaft to rotate it, said operator's stick having a separately moveable portion, a rod in said tubular shaft, one end of said rod having relative rotative movement with the other end, one end of said rod being connected to said separately moveable portion for movement therewith, first actuatable means, second actuatable means, an arm extending from said tubular shaft over said hole, means passing through the hole under said seat operatively connecting said arm with said first actuatable means so that movement of said stick transmits movement through said hole at any position of said seat to actuate said first actuatable means, said last named means including a tubular link attached at one end to said arm and extending to a point below said seat, one end of said tubular link having relative rotative movement with the other end, a lever pivoted to said aircraft below said seat, said link being connected at its other end to said lever, and second means passing through the hole under said seat and through said tubular link operatively connecting said rod with said second actuatable means so that movement of said moveable portion of said stick transmits movement through said hole and tubular link at any position of said seat to actuate said second means, said last named means including a second link operatively connected to the free end of said rod extending into said tubular link to a point below said seat, one end of said second link having relative rotative movement with the other end, a second lever pivoted to said aircraft below said seat, said second link being connected at its other end to said second lever.

10. In an aircraft, a floor, an operator's seat, said seat being mounted for rotation about an axis, said floor having a hole under said seat, an operator's control stick, means mounting said operator's control stick for movement with said seat, said mounting means having a tubular shaft mounted for rotation on said seat, said stick being connected to said shaft to rotate it, said operator's stick having a separately moveable portion, rod means in said tubular shaft, one end of said rod means being connected to said separately moveable portion for movement therewith, the other end of said rod means projecting from said tubular shaft, a first lever pivoted on said seat, the end of said rod means projecting from said tubular shaft being connected to one end of said first lever, first actuatable means, second actuatable means, an arm extending from said tubular shaft over said hole, means passing through the hole under said seat operatively connecting said arm with said first actuatable means so that movement of said stick transmits movement through said hole in any position of said seat to actuate said first actuatable means, said last named means including a tubular link attached at one end to said arm and extending to a point below said seat, a second lever pivoted to said aircraft below said seat, said link being connected at its other end to said second lever, and second means passing through the hole under said seat and through said tubular link operatively connecting said rod with said second actuatable means so that movement of said moveable portion of said stick transmits movement through said hole and tubular link at any position of said seat to actuate said second means, said last named means including a second link operatively connected to said first lever extending into said tubular link to a point below said seat, a third lever pivoted to said aircraft below said seat, said second link being connected at its other end to said third lever.

11. In an aircraft, a floor, an operator's seat, said seat being mounted for rotation about an axis, said floor having a hole under said seat, an operator's control stick, means mounting said operator's control stick for movement with said seat, said mounting means having a tubular shaft mounted for rotation on said seat, said stick being connected to said shaft to rotate it, said operator's stick having a separately moveable portion, rod means in said tubular shaft, one end of said rod means being connected to said separately moveable portion for movement therewith, the other end of said rod means projecting from said tubular shaft, a first lever pivoted on said seat, the end of said rod means projecting from said tubular shaft being connected to one end of said first lever, first actuatable means, second actuatable means, an arm extending from said tubular shaft over said hole, means passing through the hole under said seat operatively connecting said arm with said first actuatable means so that movement of said stick transmits movement through said hole at any position of said seat to actuate said first actuatable means, said last named means including a tubular link attached at one end to said arm and extending to a point below said seat, a second lever pivoted to said aircraft below said seat, said link being connected at its other end to said second lever, and second means passing through the hole under said seat and through said tubular link operatively connecting said rod with said second actuatable means so that movement of said moveable portion of said stick transmits movement through said hole and tubular link at any position of said seat to actuate said second means, said last named means including a third lever pivoted on said seat, a second link having one end connected to the free end of said first lever and the free end of said third lever, the other end of said third lever being positioned in the opening of said tubular link, a third link operatively connected to said other end of said third lever extending into said tubular link to a point below said seat, a fourth lever pivoted to said aircraft below said seat, said third link being connected at its other end to said fourth lever.

References Cited in the file of this patent

UNITED STATES PATENTS

| 1,909,450 | Bleecker | May 16, 1933 |
| 2,371,687 | Gerhardt | Mar. 20, 1945 |
| 2,774,556 | Robert | Dec. 18, 1956 |

FOREIGN PATENTS

| 495,022 | Great Britain | Nov. 1, 1938 |